(No Model.)
D. M. LEGAT.
FLEXIBLE PIPING FOR AIR BRAKES.
No. 401,706. Patented Apr. 16, 1889.
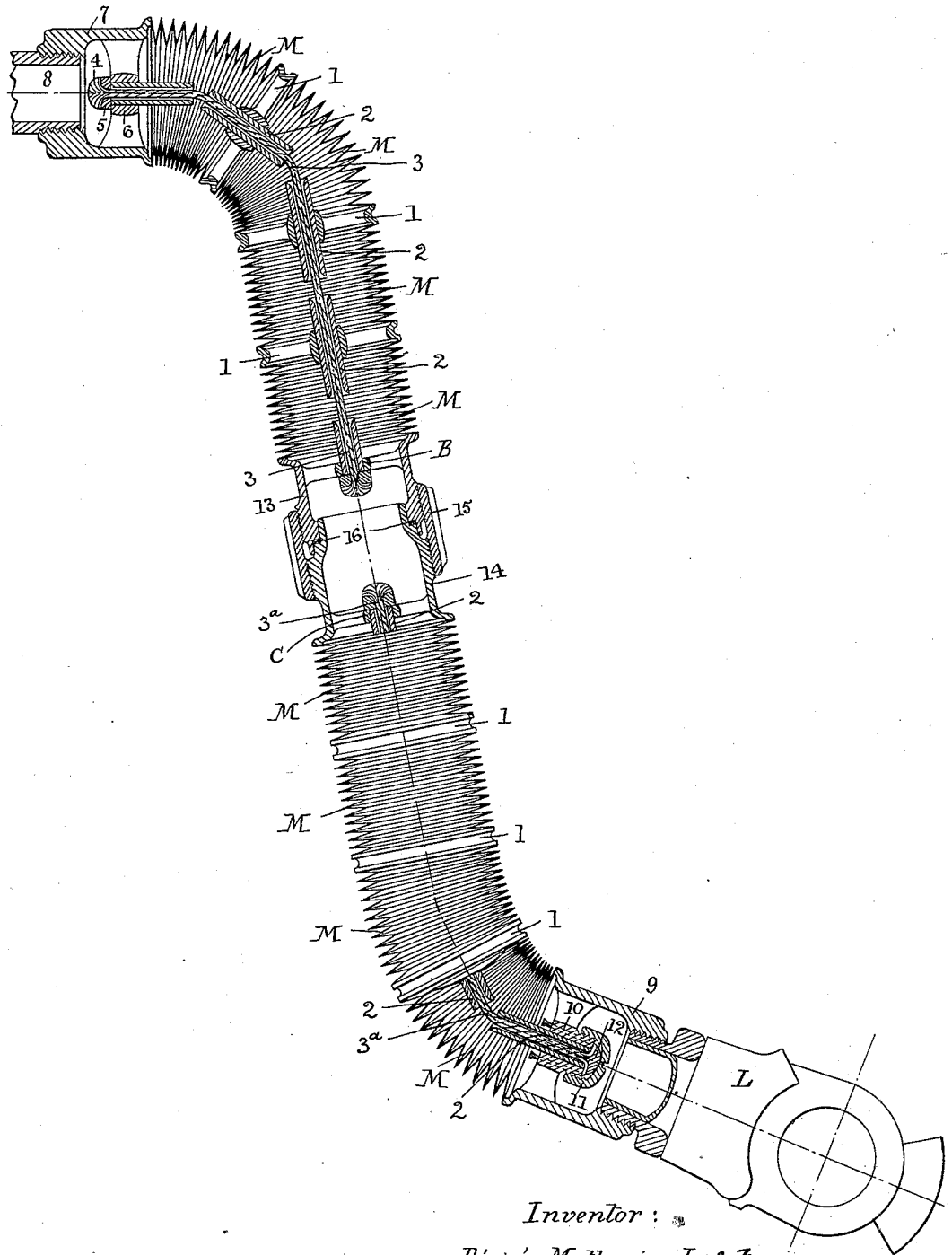
Witnesses:
Will T. Norton
Geo. G. Penney
Inventor:
Désiré Mathurin Legat
per John J. Halsted & Son
his Attorneys.

UNITED STATES PATENT OFFICE.

DÉSIRÉ MATHURIN LEGAT, OF PARIS, FRANCE.

FLEXIBLE PIPING FOR AIR-BRAKES.

SPECIFICATION forming part of Letters Patent No. 401,706, dated April 16, 1889.

Application filed September 14, 1888. Serial No. 285,406. (No model.) Patented in Germany May 17, 1887, No. 41,626; in France July 6, 1888, No. 191,635; in Belgium August 10, 1888, No. 82,852; in England August 13, 1888, No. 11,648, and in Italy August 23, 1888, XLVII, 223.

*To all whom it may concern:*

Be it known that I, DÉSIRÉ MATHURIN LEGAT, engineer, a citizen of the Republic of France, residing at Paris, France, have invented a new and useful Improvement in Flexible Piping for Air-Brakes and Like Purposes, (patented in France July 6, 1888, No. 191,635; in Belgium August 10, 1888, No. 82,852; in Italy August 23, 1888, No 223, Vol. XLVII; in England August 13, 1888, No. 11,648, and applied for in Spain August 23, 1888, and in Germany August 24, 1888, as an addition to my patent of May 17, 1887, No. 41,626;) and I do hereby declare that the following is a full, clear, and exact description of the same.

The present invention is an improvement on the flexible piping for which I have filed an application in the United States Patent Office on the 4th of June, 1887, Serial No. 240,255, which application was allowed on the 9th of July, 1888.

The arrangement of flexible piping illustrated in the annexed drawing differs from that described in my said former application in so far that I do away with the rigid pipes C' G' and hemispheres B C D F G H and replace them by a series of metallic membranes connected to each other and held together by an internal wire rope, as hereinafter described.

In the annexed drawing I have shown a flexible piping suitable for connecting the air-pipes on railway-cars provided with Westinghouse or other automatic brakes. One-half only of the said piping is shown.

M M are a set of metallic membranes, similar to those shown and described in my former application. The sets of membranes M are connected together by means of metallic rings 1, into the central boss of each of which is secured a tube, 2, for guiding and holding a wire rope, which, as hereinafter described, may be divided into two parts, 3 3ª. The uppermost end of the part 3 of the wire rope ends in the shape of a knob, 4, which bears against a washer, 5, resting against the boss 6 of a screw-threaded nozzle, 7. The nozzle 7 is screwed onto the end of the stationary pipe 8, secured to the railway-car. The part 3 of the wire rope starts from the boss 6, passes several tubes, 2, and is secured or set by its other end in a similar manner to the boss B. The part 3ª likewise starts from a boss, C, passes through the remainder of the tubes 2, and finally passes into the boss 10 of a screw-threaded piece, 9, secured to one-half, L, of an ordinary Westinghouse or other coupling.

Here the strands composing the wire rope 3ª are taken apart and are introduced separately into a hole made in the boss 10. The strands are then secured and tightened by means of a nut, 11, and an intermediate bearing-piece, 12.

The hereinbefore-described flexible piping can, as shown in the drawing, be composed of two halves connected together at the middle, or it may be composed of an uninterrupted set of membranes M connected to each other. If it is preferred to make a piping out of two halves, one of the two halves may, in case it be injured, be exchanged for another one without necessitating the removal of the other half. The two middle membranes of the piping are secured to two nozzles, 13 14, held together by a nut, 15, having a right-and-left hand thread. The joint is rendered air-tight by a packing-ring, 16, and in order to prevent any slackening or loosening of the nut 15 the same is slotted at one or more places, so that it may offer some elasticity while tightening.

If the flexible piping is made without the central nozzles, 13 14, as hereinbefore described, then the two parts 3 3ª of the wire rope are replaced by one single length.

The wire rope may be replaced by a set of chain-links or of small rods hinged together or otherwise connected to each other by screwing or otherwise.

I claim—

1. In a flexible piping, the combination of a set of membranes, M, a set of rings, 1, tubes 2, secured severally to the boss of each ring, and a wire rope extending through said tubes and serving to prevent expansion of the membranes, substantially as shown and described.

2. In a flexible piping, the combination of a set of membranes made substantially as shown and described, a series of rings, 1, interposed between each two adjacent membranes, and provided with bosses, as set forth, a series of tubes, 2, severally secured to said bosses, and wire rope extending centrally through the series of membranes, rings, and tubes, and fastened at its extremities, substantially as shown and described, and for the purposes set forth.

3. In a flexible piping having a set of membranes, M, the combination, with such membranes, of a wire rope extending through the same, a perforated boss, 10, through which the separated strands at the ends of the wire are passed, and a nut serving to fasten such ends to the boss, all substantially as shown and described.

In witness whereof I have hereunto signed my name in the presence of two subscribing witnesses.

DÉSIRÉ MATHURIN LEGAT.

Witnesses:
R. H. BRANDON,
D. H. BRANDON, Jr.